(12) United States Patent
Schrader et al.

(10) Patent No.: US 9,579,529 B2
(45) Date of Patent: Feb. 28, 2017

(54) LAVATORY OXYGEN CONTAINER ADAPTOR

(71) Applicant: B/E Aerospace, Inc., Wellington, FL (US)

(72) Inventors: Adam Lee Schrader, Lawrence, KS (US); Kenneth Michael Murta, Overland Park, KS (US); Mark Wesley McLelland, Lees Summit, MO (US)

(73) Assignee: B/E Aerospace, Inc., Wellington, FL (US)

( * ) Notice: Subject to any disclaimer, the term of this patent is extended or adjusted under 35 U.S.C. 154(b) by 108 days.

(21) Appl. No.: 14/090,734

(22) Filed: Nov. 26, 2013

(65) Prior Publication Data
US 2014/0151422 A1     Jun. 5, 2014

Related U.S. Application Data

(60) Provisional application No. 61/732,793, filed on Dec. 3, 2012.

(51) Int. Cl.
*A62B 25/00* (2006.01)
*A62B 7/08* (2006.01)
(Continued)

(52) U.S. Cl.
CPC ............... *A62B 25/00* (2013.01); *A62B 7/08* (2013.01); *B64D 25/00* (2013.01); *F17C 13/084* (2013.01); *B64D 2231/00* (2013.01); *F17C 2201/0119* (2013.01); *F17C 2201/058* (2013.01); *F17C 2205/0111* (2013.01);
(Continued)

(58) Field of Classification Search
CPC ............ F17C 13/084; F17C 2205/0153; F17C 2260/018; F17C 2270/0189; F17C 2201/0119; F17C 2201/058; F17C 2205/0111; F17C 2205/0126; F17C 2205/0157; F17C 2221/011; A62B 9/04;
(Continued)

(56) References Cited

U.S. PATENT DOCUMENTS 2,344,513 A     3/1944  Mapes
4,606,521 A *  8/1986  Williams ...................... 248/214
(Continued)

FOREIGN PATENT DOCUMENTS

CN     2856693 Y     1/2007
FR     2795029 A1    12/2000
FR     2886621 A1    12/2006

OTHER PUBLICATIONS

International Search Report, May 12, 2014, 7 pages.
Chinese Search Report, Mar. 2, 2016, 1 page, from App. No. 201380067735X.

*Primary Examiner* — Adam Waggenspack
(74) *Attorney, Agent, or Firm* — Shumaker, Loop & Kendrick, LLP

(57) ABSTRACT

Various adaptor configurations are provided that allow newly mandated replacement oxygen modules to replace oxygen generators in the same containers that are currently used in aircraft lavatories. The replacement modules and oxygen generators differ in terms of overall interface dimension, geometries and weights. The adaptors enable replacement modules to be mounted without, or with only minimal, modification of the oxygen containers.

2 Claims, 12 Drawing Sheets

(51) Int. Cl.
*F17C 13/08* (2006.01)
*B64D 25/00* (2006.01)

(52) U.S. Cl.
CPC ............... *F17C 2205/0126* (2013.01); *F17C 2205/0157* (2013.01); *F17C 2221/011* (2013.01); *F17C 2260/018* (2013.01); *F17C 2270/0189* (2013.01)

(58) Field of Classification Search
CPC .. A62B 25/00; A62B 7/08; A62B 7/14; B64D 2231/00; B64D 25/00
USPC ............................... 224/552, 567–572, 275
See application file for complete search history.

(56) References Cited

U.S. PATENT DOCUMENTS

| | | | | |
|---|---|---|---|---|
| 4,832,398 | A | * | 5/1989 | Tecca ...................... B63C 11/22 294/151 |
| 5,829,629 | A | * | 11/1998 | Usher .......................... 220/724 |
| 6,170,518 | B1 | * | 1/2001 | Ratelle .......................... 137/376 |
| 6,202,674 | B1 | | 3/2001 | Wingett |
| 6,378,327 | B1 | | 4/2002 | Corrigan et al. |
| 8,517,636 | B2 | | 8/2013 | Wrigley et al. |
| 8,915,682 | B2 | | 12/2014 | Mulanon |
| 2011/0083645 | A1 | | 4/2011 | Herzer |
| 2012/0183370 | A1 | * | 7/2012 | Mulanon ........................ 410/50 |

* cited by examiner

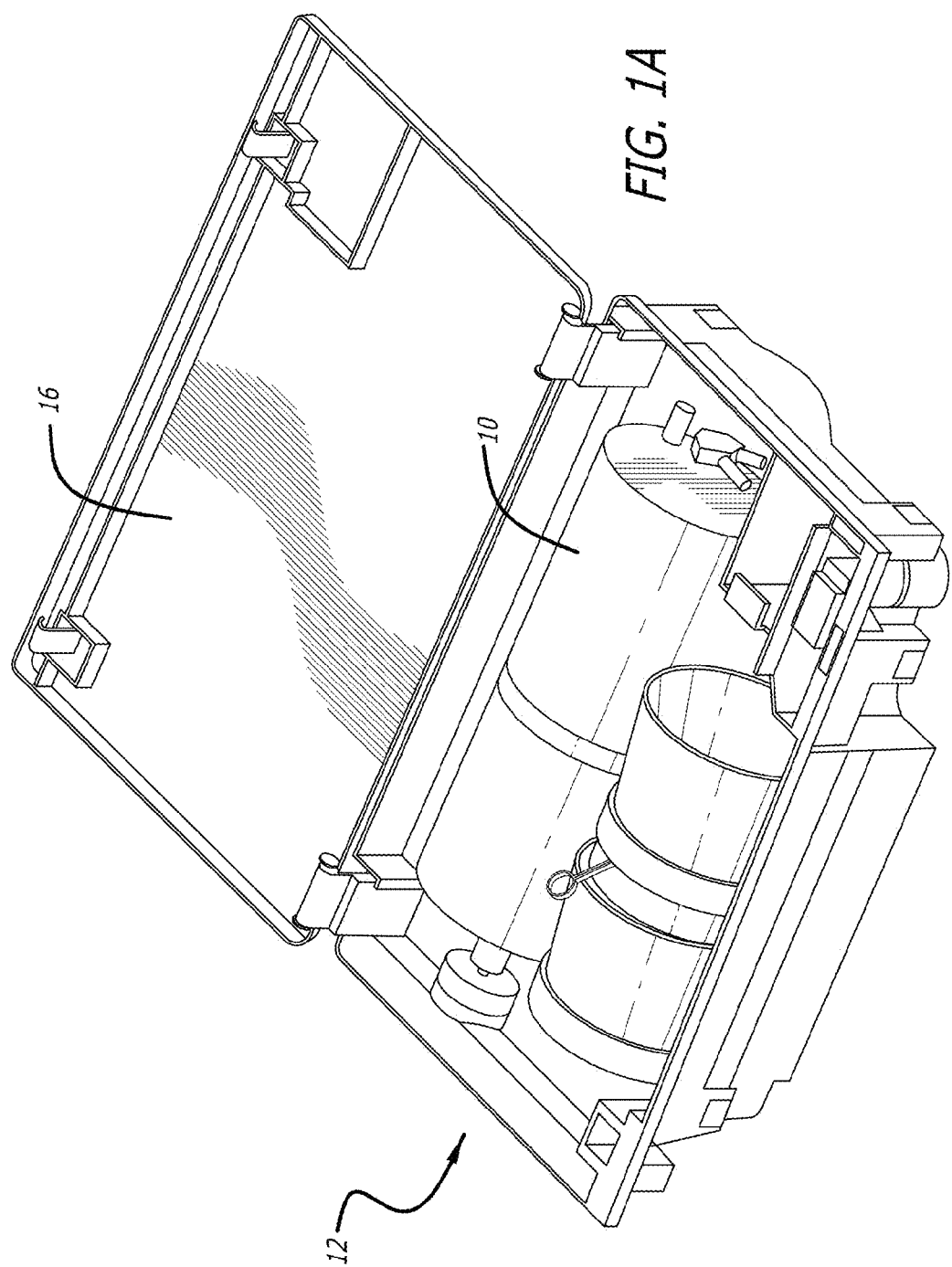

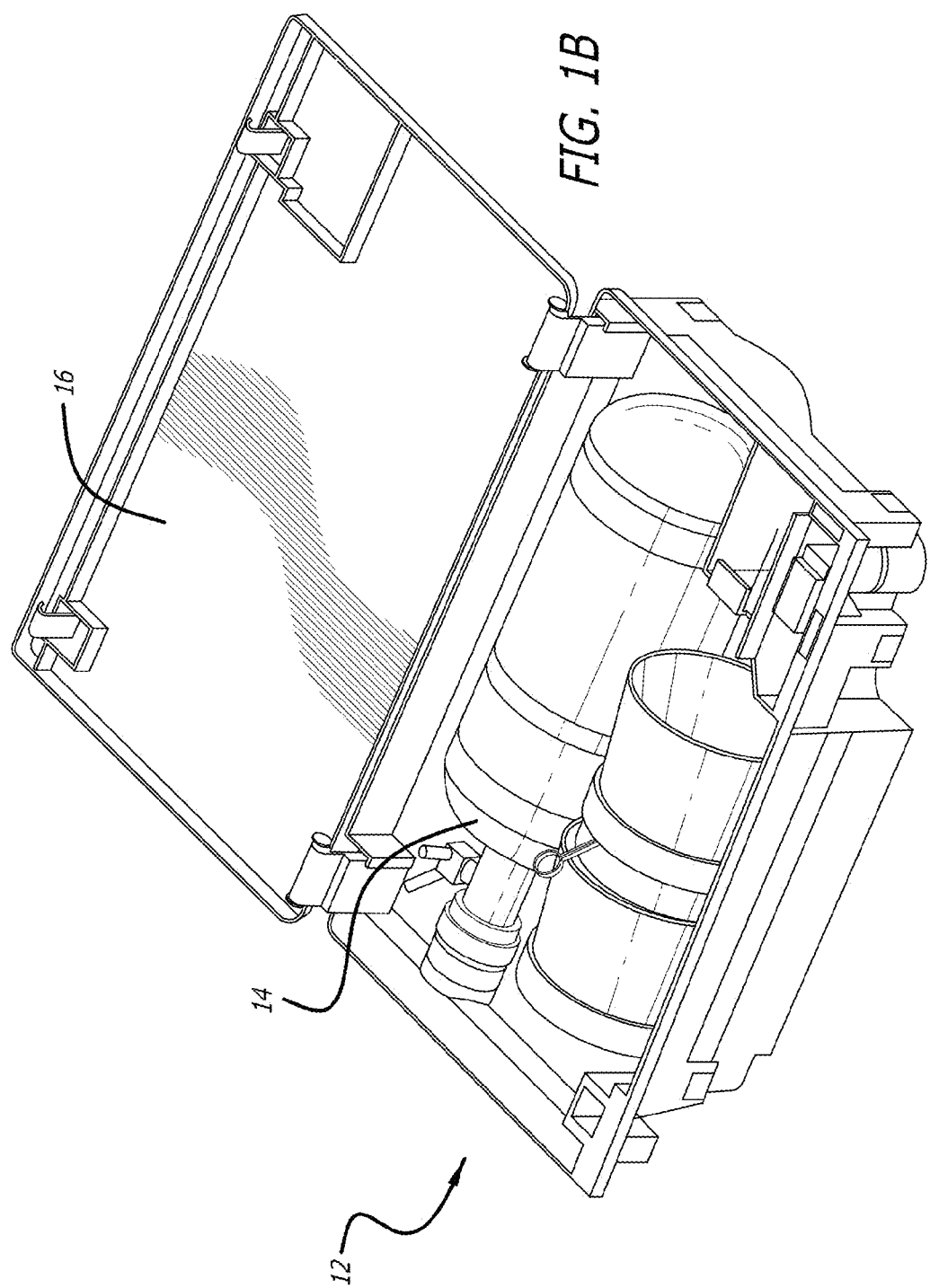

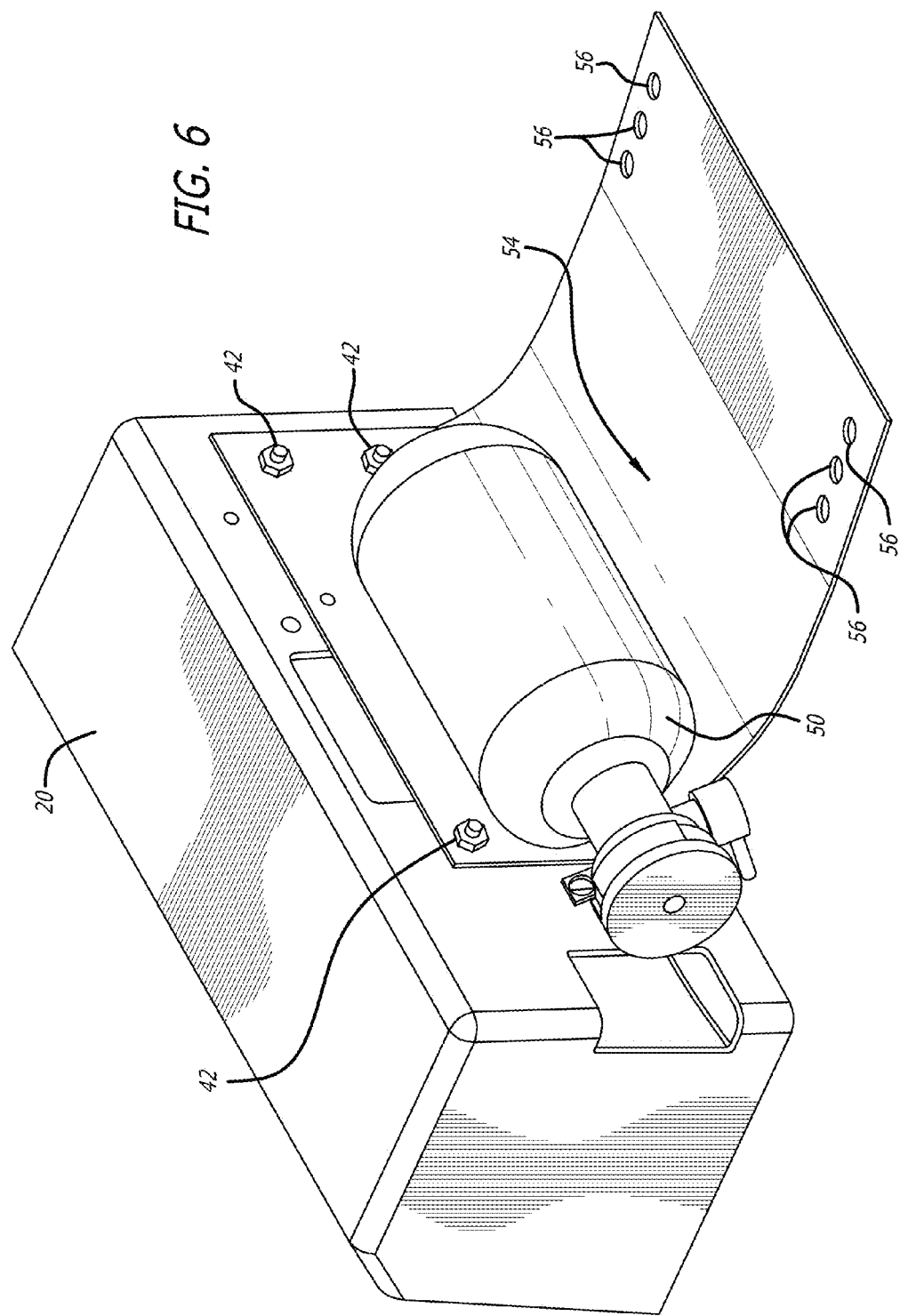

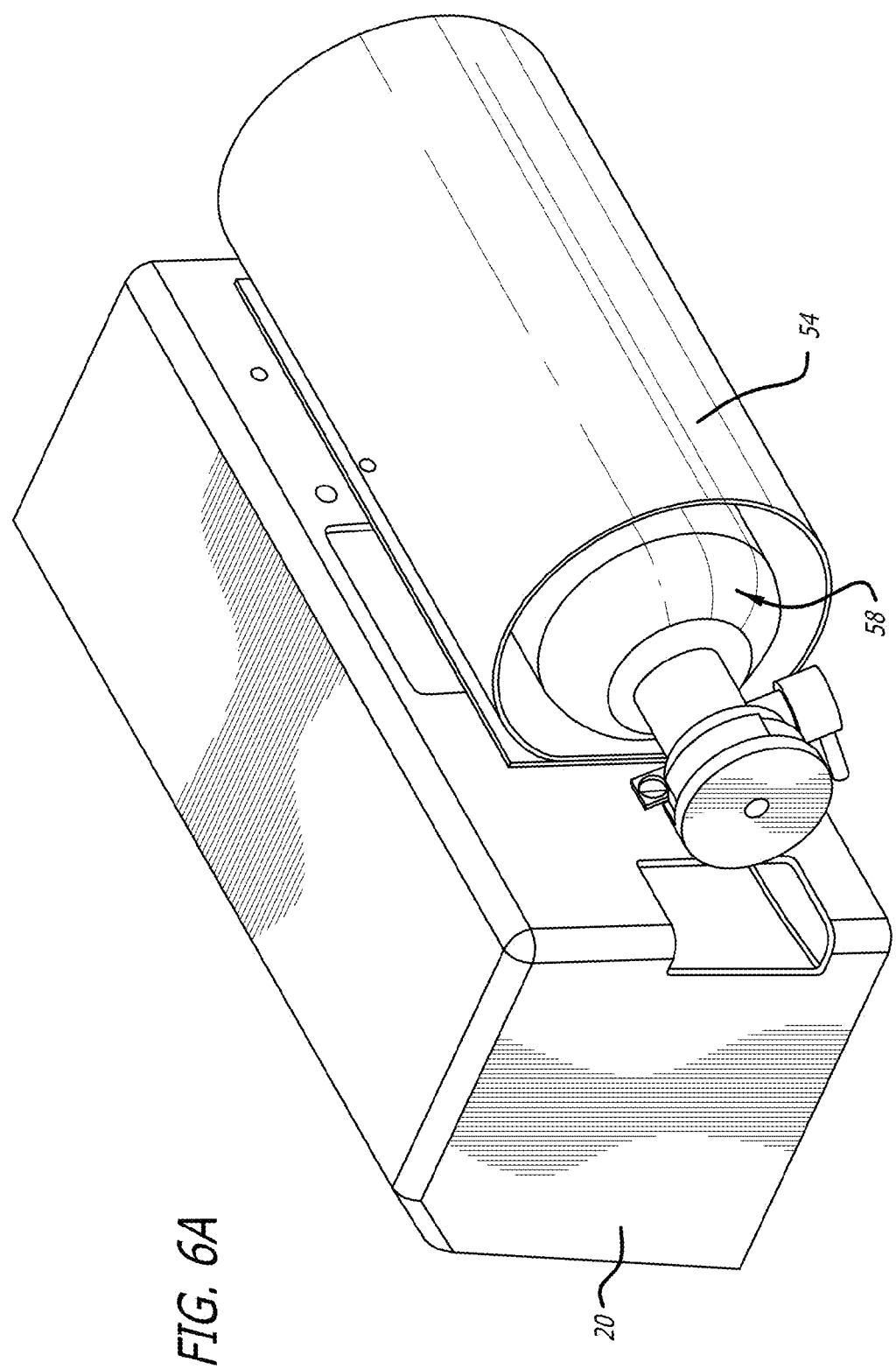

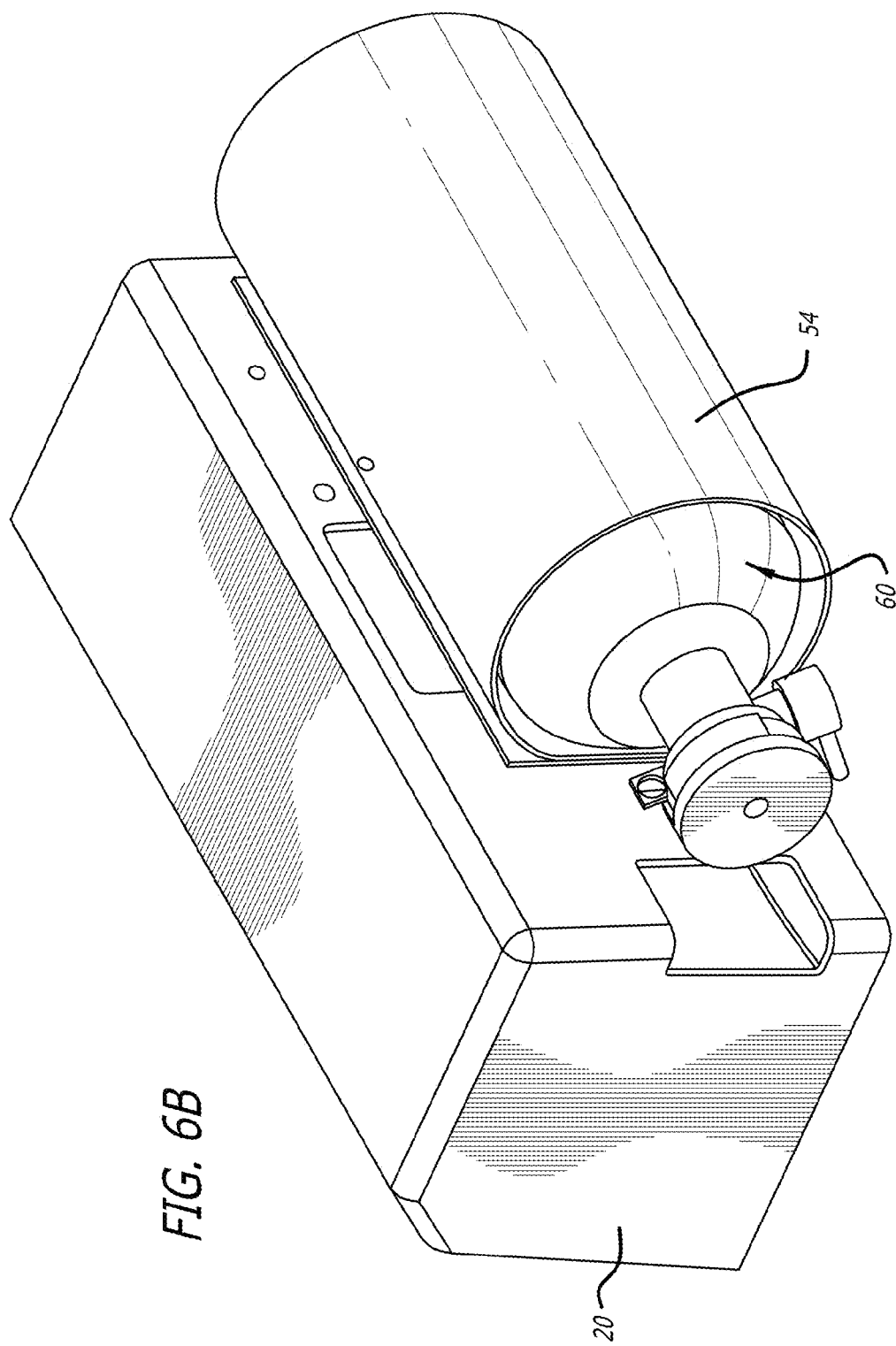

LAVATORY OXYGEN CONTAINER ADAPTOR

CROSS-REFERENCES TO RELATED APPLICATIONS

This application claims priority from U.S. application No. 61/732,793, filed Dec. 3, 2012, incorporated by reference in its entirety.

BACKGROUND

The invention generally relates to aircraft lavatory oxygen modules, and more particularly to the adaptation of newly mandated replacement oxygen modules for use within existing oxygen containers that are configured for accommodating chemical oxygen generators.

The FAA Airworthiness Directive Docket No. FAA-2012-0102; Directorate Identifier 2012-NM-004-AD; Amendment 39-17072; AD 2012-11-09 requires the use of new replacement oxygen modules in lavatory oxygen containers to replace the chemical oxygen generators that are currently in use. The oxygen modules do not have the same overall interface dimension, geometries, center of gravity or weight as the chemical oxygen generators for which the current oxygen containers are configured. It is most desirable to be able to adapt the replacement modules for use in the existing oxygen containers without altering or by only minimally altering the basis for the certification of the existing oxygen containers.

A way of adapting the replacement oxygen modules is therefore needed that requires no (or only minimal) modification of the existing oxygen containers that are currently installed in aircraft.

SUMMARY OF THE INVENTION

Briefly, and in general terms, the present invention provides for the adaptation of replacement oxygen modules within aircraft lavatory containers that are configured for accommodating the previously used chemical oxygen generators. The adaptation schemes of the present invention compensate for differences in overall interface dimension, geometries, center of gravity and weight and require no modification or only minimal modification of existing oxygen containers that are currently installed in aircraft. As a result, the basis for the certification of the container will not be altered.

The present invention accordingly provides for an aircraft lavatory oxygen container adaptor for mounting an aircraft oxygen module within an aircraft lavatory oxygen container configured to contain an aircraft chemical oxygen generator to be replaced, the aircraft oxygen module having an outer diameter that is smaller than an outer diameter of the aircraft chemical oxygen generator, the aircraft lavatory oxygen container adaptor. The aircraft lavatory oxygen container adaptor preferably includes a mounting member connected to the aircraft lavatory oxygen container, and one or more straps connected to the mounting member, the one or more straps being configured to extend around the aircraft oxygen module and to secure the aircraft oxygen module to the aircraft lavatory oxygen container.

In one presently preferred aspect, the one or more straps include first and second straps affixed to the mounting member, and the aircraft lavatory oxygen container adaptor includes a canister configured to contain the aircraft oxygen module, the canister having an outer diameter configured to substantially match the outer diameter of the aircraft chemical oxygen generator to be replaced, and the first and second straps extending around the canister and configured to secure the canister to the mounting member. In another presently preferred aspect, the canister includes one or more internal cradles having an inner diameter that matches the outer diameter of the aircraft oxygen module. In another presently preferred aspect, first and second compressible spacers are disposed between each of the straps and the canister, respectively. In another presently preferred aspect, first and second fixed cradles are disposed between the canister and the mounting member. In another presently preferred aspect, the canister includes a base portion for receiving a base of the aircraft oxygen module, and spacing material is configured to be disposed between the base portion of the canister and the base of the aircraft oxygen module.

In another presently preferred aspect, the one or more straps comprises first and second straps affixed to the mounting member, and first and second compressible diameter spacers are configured to be disposed between the straps and the aircraft oxygen module, the inner diameter of the diameter spacers matching the outer diameter of the replacement oxygen module, and an outer diameter of the first and second compressible diameter spacers matching the outer diameter of the oxygen generator to be replaced. In another presently preferred aspect, first and second fixed cradles disposed between the aircraft oxygen module and the mounting member.

In another presently preferred aspect, the one or more straps include first and second straps affixed to the mounting member, and first and second mounting brackets are secured to the mounting member and are configured to cradle the aircraft oxygen module. The first and second straps are connected to the first and second mounting brackets, respectively, and the first and second straps are configured to extend around the aircraft oxygen module and secure the aircraft oxygen module to the mounting member. In another presently preferred aspect, first and second fasteners configured to secure the first and second straps, respectively, and to positively hold the aircraft oxygen module in the first and second straps.

In another presently preferred aspect, the one or more straps include a strap configured to extend along an entire length of the aircraft oxygen module and to envelope the aircraft oxygen module, the strap having a plurality of mounting holes configured to be secured to the mounting member and a plurality of openings formed in the strap configured to allow a diameter of the strap to be adjusted to wrap around and secure the aircraft oxygen module to the mounting member.

In another presently preferred aspect, the mounting member includes a support trough, the one or more straps include first and second straps affixed to the mounting member, and the first and second straps are connected to the support trough, the support trough including a plurality of openings formed along a length of the support trough and configured to allow the first and second straps to pass therethrough. In another presently preferred aspect, first and second fasteners are configured to secure the first and second straps, respectively, and are configured to positively hold the aircraft oxygen module in the first and second straps.

These and other features and advantages of the present invention will become apparent from the following detailed description of preferred embodiments which, taken in conjunction with the accompanying drawings, illustrate by way of example the principles of the invention.

BRIEF DESCRIPTION OF THE DRAWINGS

FIG. 1A is a perspective view of a chemical oxygen generator in place within an oxygen container.

FIG. 1B is a perspective view of a replacement oxygen module adapted in accordance with the present invention in place within an oxygen container.

FIGS. 6, 6A and 6B are perspective views of a further alternative preferred embodiment of the present invention for mounting a replacement oxygen module within an oxygen container.

DETAILED DESCRIPTION OF THE PREFERRED EMBODIMENTS

FIG. 1A illustrates a previously allowed chemical oxygen source 10, such as a chemical oxygen generator, installed within a lavatory oxygen container 12 while FIG. 1B illustrates a newly mandated replacement oxygen module 14 installed in the same lavatory oxygen container 12. The oxygen containers are shown with their doors or covers 16 in an open position to reveal the arrangement of the components therein. The chemical oxygen generator and the replacement oxygen module differ in terms of geometries, including diameter, length, fixation points and center of gravity.

Figure 2:
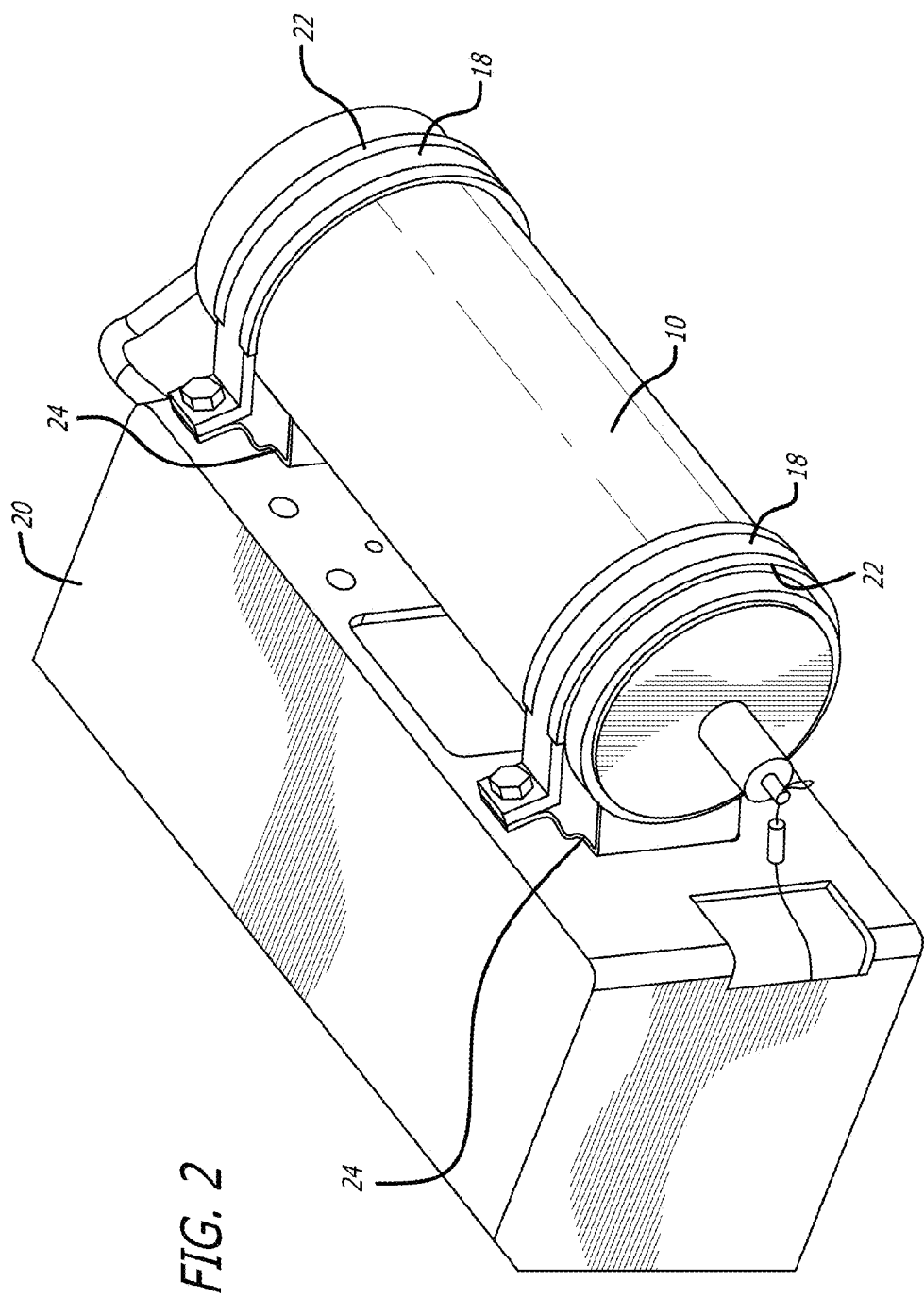
FIG. 2 is a perspective view of a prior art oxygen generator mounting.

FIG. 2 provides a more detailed view of a mounting configuration for the previously allowed chemical oxygen generators within a lavatory oxygen container 12. The generator 10 is held in place by two fixed straps 18 that extend about its diameter and are affixed to a mounting member 20. Compressible spacers 22 are disposed between the straps and the oxygen generator while fixed cradles 24 are disposed between oxygen generator and the mounting member.

Figure 3A:
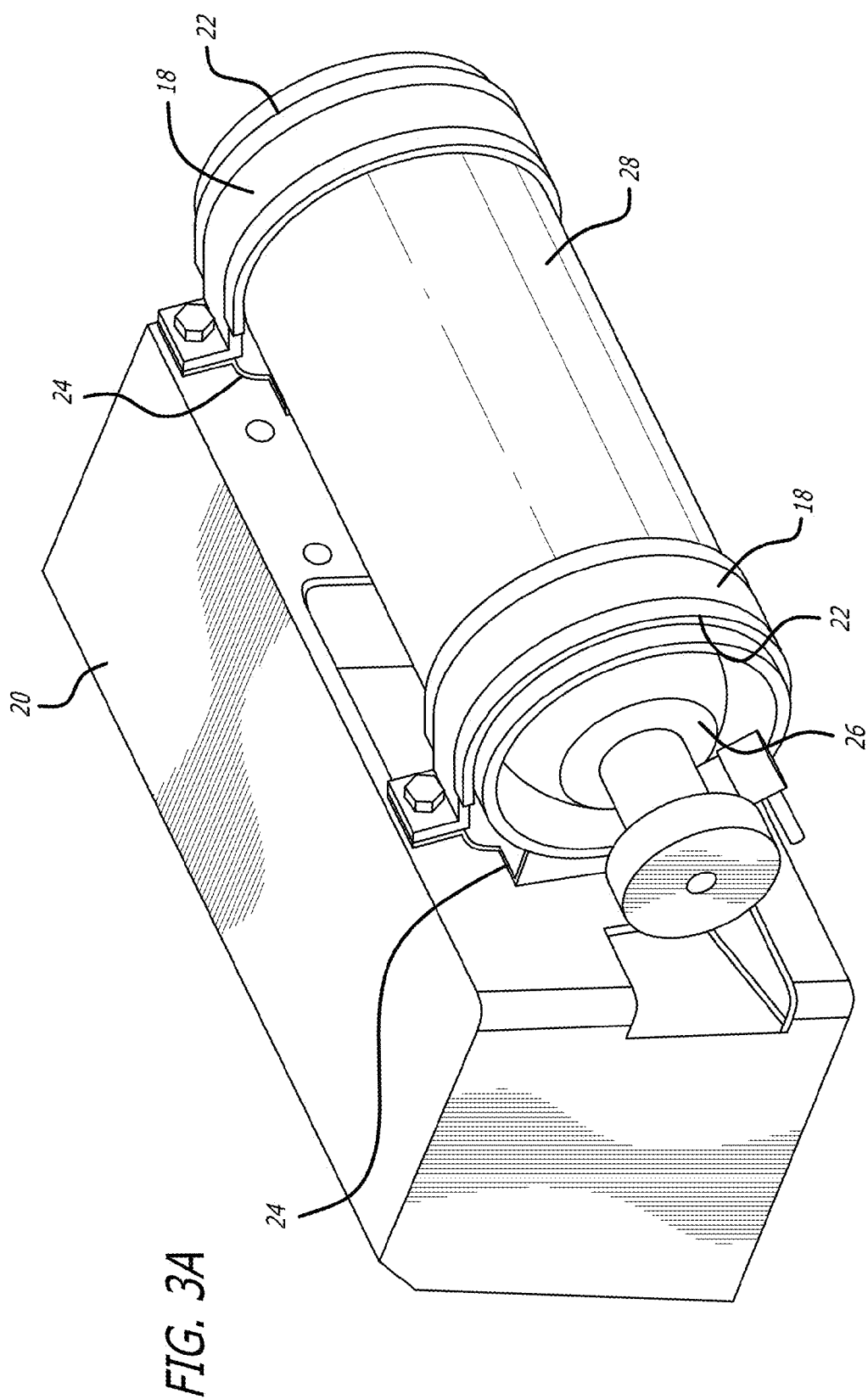
FIG. 3A is a view of a preferred embodiment of the present invention for mounting a replacement oxygen module within an oxygen container.
Figure 3B:
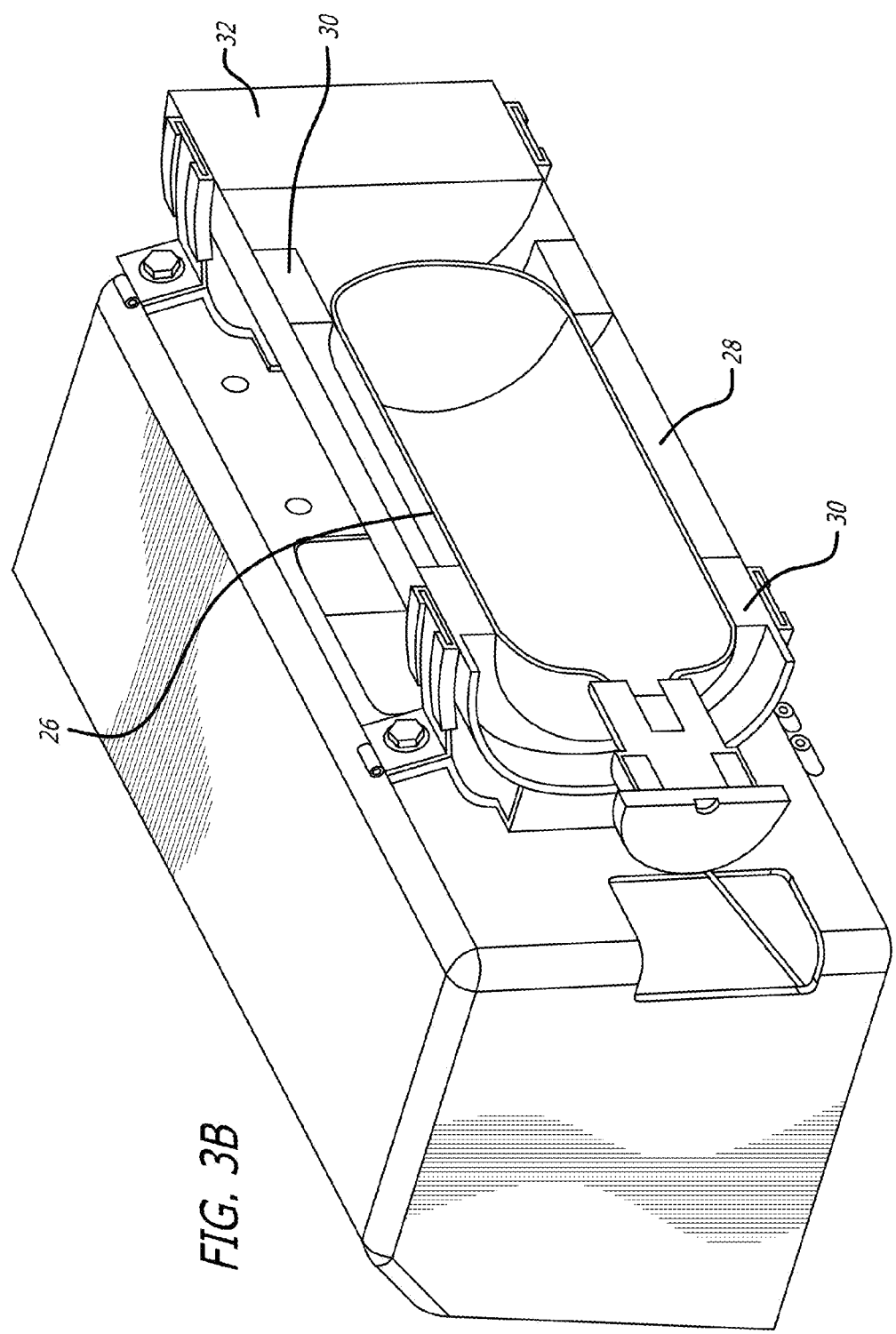
FIG. 3B is a cut-away illustration of the preferred embodiment shown in FIG. 3A.

FIGS. 3A and 3B illustrate a preferred embodiment of the present invention which provides for the mounting of a replacement oxygen module 26 which is significantly smaller than the oxygen generator that it replaces. The same straps 18, spacers 22 and cradles 24 that are shown in FIG. 2 are used to mount the canister 28 that contains the module 26 to the mounting member 20. The canister is relied upon to compensate for the difference in size between the oxygen generator and the replacement oxygen module wherein the inner diameter of internal cradles 30 match the outer diameter of the replacement oxygen module and its outer diameter matches the outer diameter of the oxygen generator that is being replaced. Additional spacing material 32 at the base of the module compensates for the difference in length.

Figure 4:
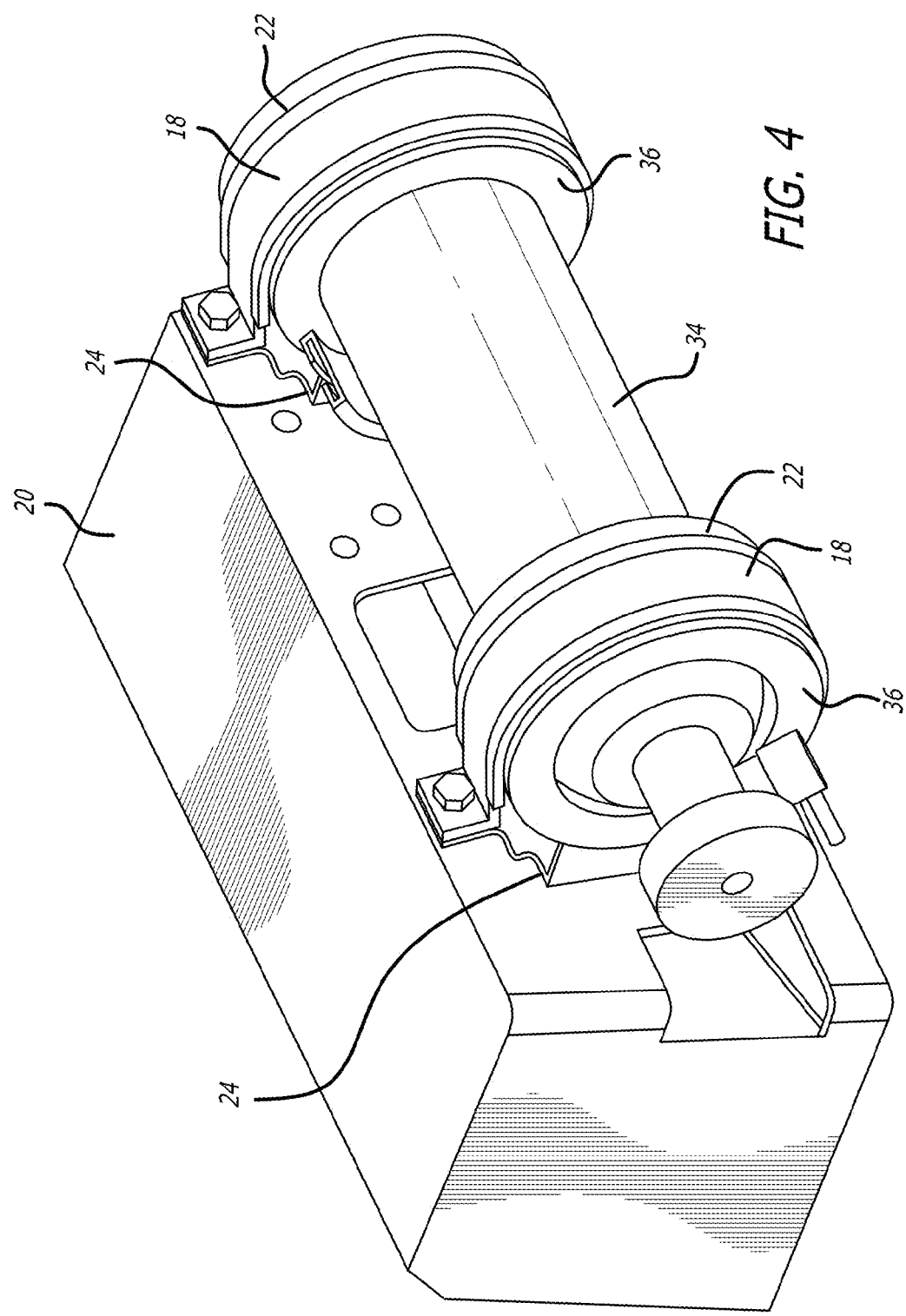
FIG. 4 is a perspective view of an alternative preferred embodiment of the present invention for mounting a replacement oxygen module within an oxygen container.

FIG. 4 illustrates an alternative preferred embodiment of the present invention which provides for the mounting of a replacement oxygen module 34 which is significantly smaller than the oxygen generator that it replaces. The same straps 18, spacers 22 and cradles 24 that are shown in FIG. 2 are used to mount the module 34 to the mounting member 20. Diameter spacers 36 are relied upon to compensate for the difference in diameter between the oxygen generator and the replacement oxygen module wherein the inner diameter of the diameter spacers match the outer diameter of the replacement oxygen module and the outer diameter of the diameter spacers match the outer diameter of the oxygen generator that is being replaced.

Figure 5:
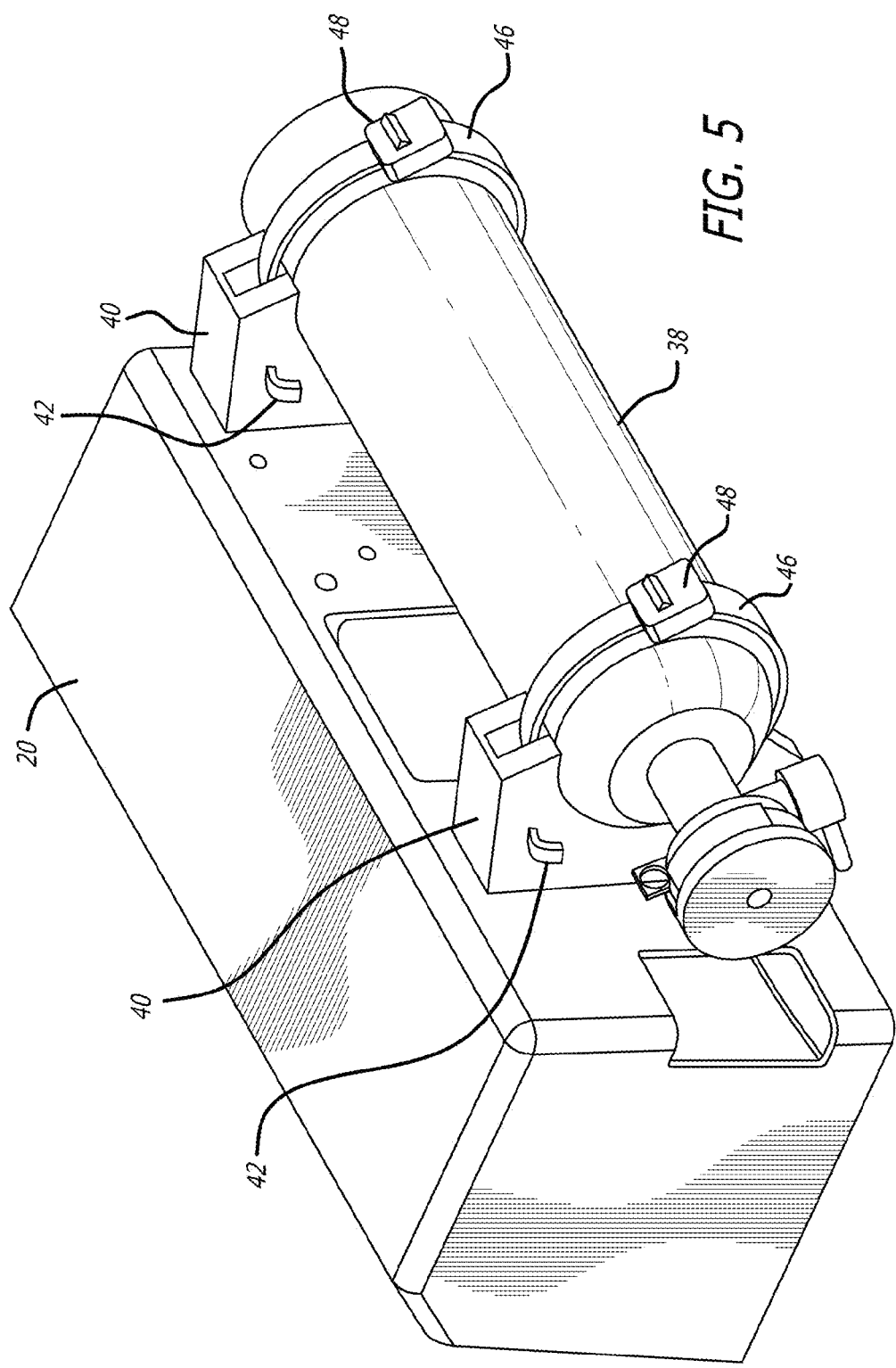
FIG. 5 is a perspective view of another alternative preferred embodiment of the present invention for mounting a replacement oxygen module within an oxygen container.

FIG. 5 illustrates another preferred embodiment of the present invention which provides for the mounting of a replacement oxygen module 38 which is significantly smaller than the oxygen generator that it replaces. Replacement spacer brackets 40 are used that are configured to mount via existing fastener locations 42 in the container mounting element 20 and cradle the replacement oxygen module. The cradle brackets are further configured to accommodate straps 46 therethrough which extend about the module. Any of various fastening means 48 may be employed to secure the straps and positively hold the oxygen module in place.

FIG. 6 illustrates a further preferred embodiment of the present invention which provides for the mounting of a replacement oxygen module 52 with dimensions that are different than those of the oxygen generator that it replaces. A strap 54 is sized to envelope the entire module and has mounting holes that match the existing fastener locations 42 that are formed in the container mounting element 20. Openings 56 formed in the strap allow the diameter of the strap to be adjusted to wrap around and fix modules of various diameters in place. FIG. 6A illustrates a small diameter replacement oxygen module 58 mounted to the container mounting element 20, while FIG. 6B illustrates a large diameter replacement oxygen module 60 mounted to the same container mounting element 20.

Figure 7:
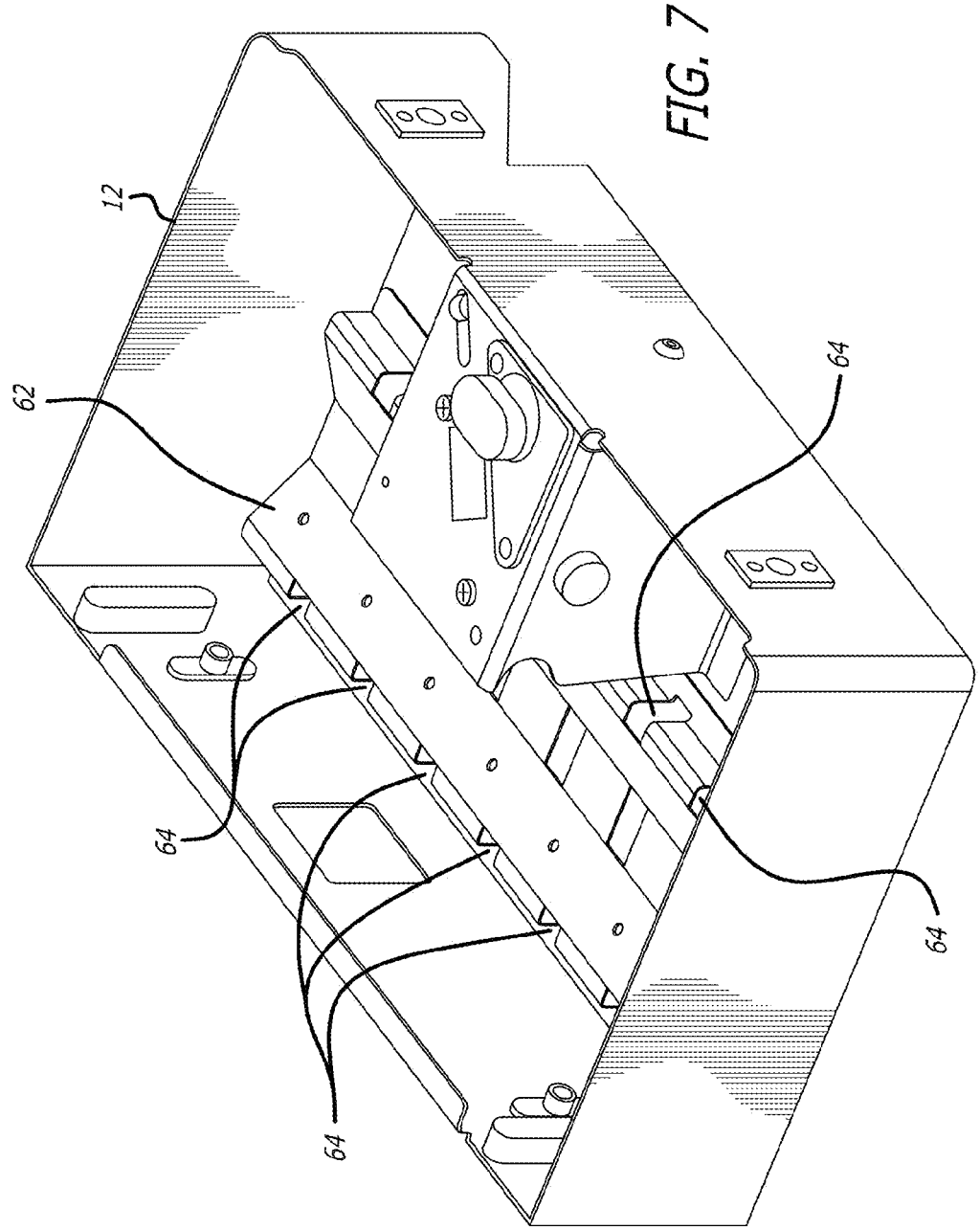
FIGS. 7 and 7A are perspective views of an additional alternative preferred embodiment of the present invention for mounting a replacement oxygen module with an oxygen container.
Figure 7A:
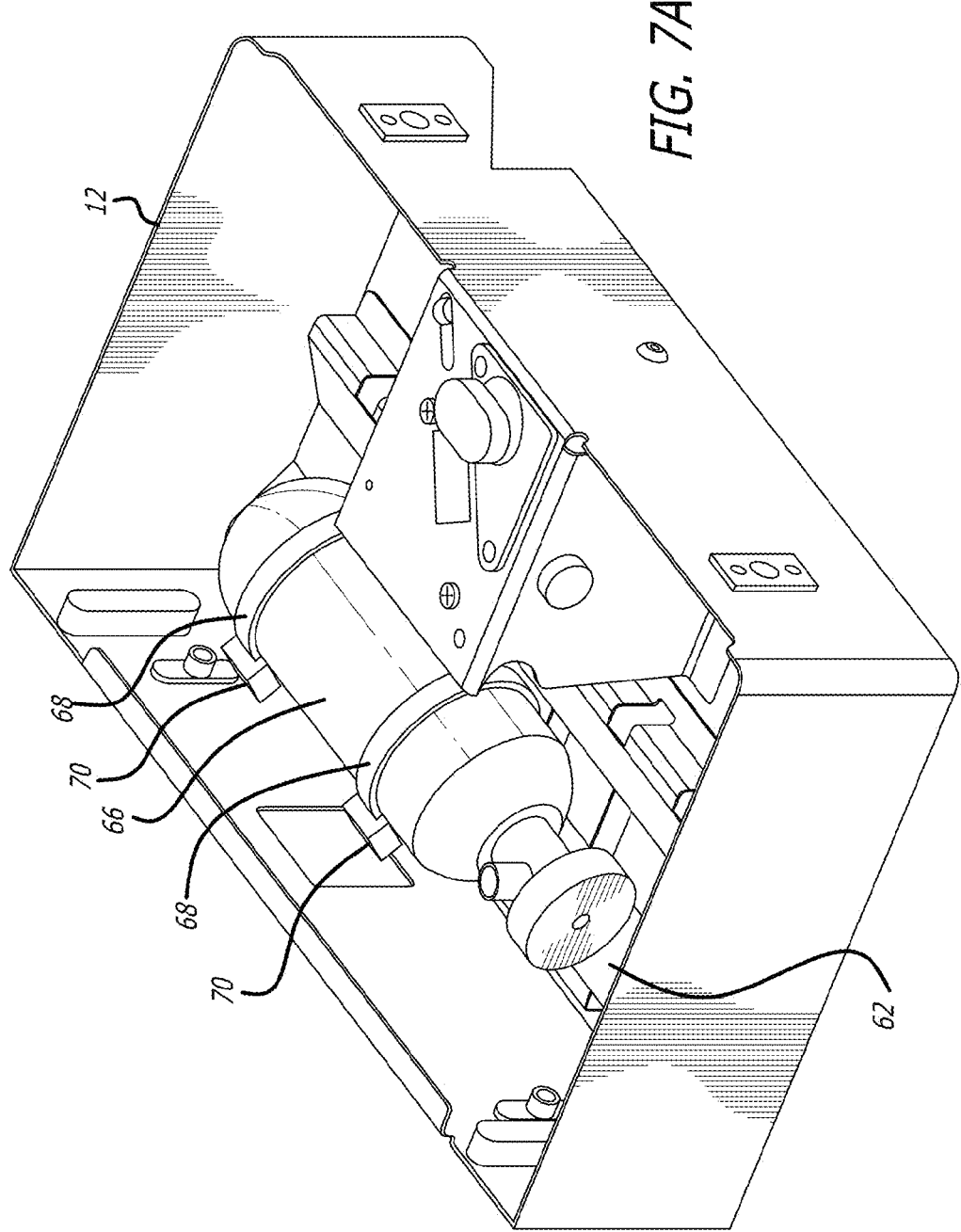

FIG. 7 illustrates another preferred embodiment of the present invention which provides for the mounting of replacement oxygen modules of a wide range of sizes to the oxygen container 12. The embodiment relies on a support trough 62 that is mounted directly to the oxygen container. A series of openings 64 are formed along its length that are configured to allow straps to pass therethrough. FIG. 7A illustrates an oxygen module 66 in place on the adaptor trough within the oxygen container. Straps 68 pass through the appropriate openings in the trough and about the module while fastening means 70 secure the straps and hence the module in place.

As a further alternative, strap on lug mounts can be relied upon to provide protrusions from the replacement oxygen module by which the module can be mounted. The mounting lugs could be strapped on or secured to the module by a welding or gluing secondary process.

While particular forms of the invention have been illustrated and described, it will be apparent to those skilled in the art that various modification can be made without departing from the spirit and scope of the invention. Accordingly, it is not intended that the invention be limited except by the appended claims.

What is claimed is:

1. An aircraft lavatory oxygen container adaptor for mounting an aircraft oxygen module within an aircraft lavatory oxygen container configured to contain an aircraft chemical oxygen generator to be replaced, the aircraft oxygen module having an outer diameter that is smaller than an outer diameter of the aircraft chemical oxygen generator, the aircraft lavatory oxygen container adaptor comprising:

a mounting member connected to the aircraft lavatory oxygen container;

an aircraft oxygen module having a tank portion and a valve portion;

a cylindrical canister enclosing the tank portion of the aircraft oxygen module, the canister having an outer diameter configured to substantially match the outer diameter of the aircraft chemical oxygen generator to be placed, and said canister including an annular cradle and a longitudinal spacer completely within the cylindrical canister for retaining the aircraft oxygen module, the longitudinal spacer defined by a cylindrical body that occupies a first end of the cylindrical canister;

first and second straps connected to said mounting member, said first and second straps extending around said cylindrical canister from a first mounting position on the mounting member to a second mounting position on the mounting member to secure said cylindrical canister and the aircraft oxygen module to said mounting member;

first and second compressible spacer disposed between each of said straps and said canister, respectively, said first and second compressible spacers defining a cavity for receiving the first and second straps therein, respectively; and first and second cradles mounted to the mounting member at the first and second mounting positions, respectively, the first and second cradles spacing the cylindrical canister from the mounting member;

wherein a portion of the aircraft oxygen module protrudes from an interior of the cylindrical canister.

2. The aircraft lavatory oxygen container adaptor of claim 1, further comprising first and second fasteners configured to secure said first and second straps, respectively, and configured to positively hold the aircraft oxygen module in said first and second straps.

* * * * *

UNITED STATES PATENT AND TRADEMARK OFFICE
CERTIFICATE OF CORRECTION

PATENT NO.         : 9,579,529 B2                                       Page 1 of 1
APPLICATION NO.    : 14/090734
DATED              : February 28, 2017
INVENTOR(S)        : Adam Lee Schrader et al.

It is certified that error appears in the above-identified patent and that said Letters Patent is hereby corrected as shown below:

In the Claims

Column 5, Line 12, delete the word "placed" and enter --replaced--.

Column 6, Line 4, delete the word "spacer" and enter --spacers--.

Signed and Sealed this
Ninth Day of May, 2017

Michelle K. Lee
*Director of the United States Patent and Trademark Office*